L. S. CASSIDY ET AL

July 26, 1932. AMUSEMENT RAILWAY Re. 18,544

Original Filed Feb. 16, 1929 3 Sheets-Sheet 1

Witness

Inventors

Leon S. Cassidy,

Marvin Rempfer,

By H. B. Willson & Co

Attorneys

L. S. CASSIDY ET AL

July 26, 1932. AMUSEMENT RAILWAY Re. 18,544

Original Filed Feb. 16, 1929 3 Sheets-Sheet 2

Witness

Inventors

Leon S. Cassidy,
Marvin Rempfer,

By H. R. Williams & Co

Attorneys

L. S. CASSIDY ET AL

July 26, 1932. AMUSEMENT RAILWAY Re. 18,544

Original Filed Feb. 16, 1929 3 Sheets-Sheet 3

Witness

Inventors

Leon S. Cassidy,
Marvin Rennyfer,

By H. Blair Wilson & Co

Attorneys

Reissued July 26, 1932 Re. 18,544

UNITED STATES PATENT OFFICE

LEON S. CASSIDY AND MARVIN REMPFER, OF BRIDGETON, NEW JERSEY

AMUSEMENT RAILWAY

Original No. 1,740,496, dated December 24, 1929, Serial No. 340,550, filed February 16, 1929. Application for reissue filed April 14, 1931. Serial No. 530,114.

The invention relates to railways for use at pleasure parks and other places for giving enjoyable rides either in small individual cars or in trains of such cars.

It is one object of the invention to provide a railway in which the front portion of each car is guided by a wheel engaging a track, while the rear portion of said car is supported by wheels which run upon a floor which supports the track, the rear wheels being spaced from the track so that the rear end of the car may lash or otherwise move transversely of the track. A further advantage of such a three point support for the car with the front wheel support guided by the single track rail, resides in the fact that the car is enabled to make very short turns and hence a relatively long length of track may be installed in a small area as compared with the prior art four wheeled cars running on two parallel track rails.

It is a further object of the invention to provide novel means for supplying current to a driving motor for the car.

Yet another object is to provide an amusement railway which embodies a loading and unloading length of track and a pleasure ride length of track, both lengths having current conductors with the conductors of one length independent of those of the other length, and to provide means for conducting current to the conductors of the pleasure ride length of track and independent switch-controlled means for conducting current at will to the conductors of said loading and unloading length of track, each car being provided with current pick-up means engageable with the conductors of either length of track to conduct current to the car-driving motor. Thus, the cars upon the loading and unloading length of track may remain idle except when the person in charge desires to move them from one point to another or to advance them into the pleasure ride portion of the track, and while the cars on this last-named portion of the track continue in operation, those on the loading and unloading portion of the track may remain either still or may be moved at the will of the attendant. Moreover, whenever there is no current being fed to the loading and unloading portion of the track, as soon as a car reaches it from the other portion of said track, supply of current to the car motor is cut off so that it will either drift to a standstill or may be stopped by a brake or otherwise.

Preferably the pleasure ride portion of the track is within a darkened building and a further object of the invention is to provide entrance and exit vestibules for said building through which the track passes, said vestibules being provided with car-opened self-closing doors so arranged that light is excluded from the building when a car is either entering or leaving.

With the foregoing and minor objects in view, the invention resides in the novel subject matter hereinafter described and claimed, description being accomplished by reference to the accompanying drawings.

Figure 1:
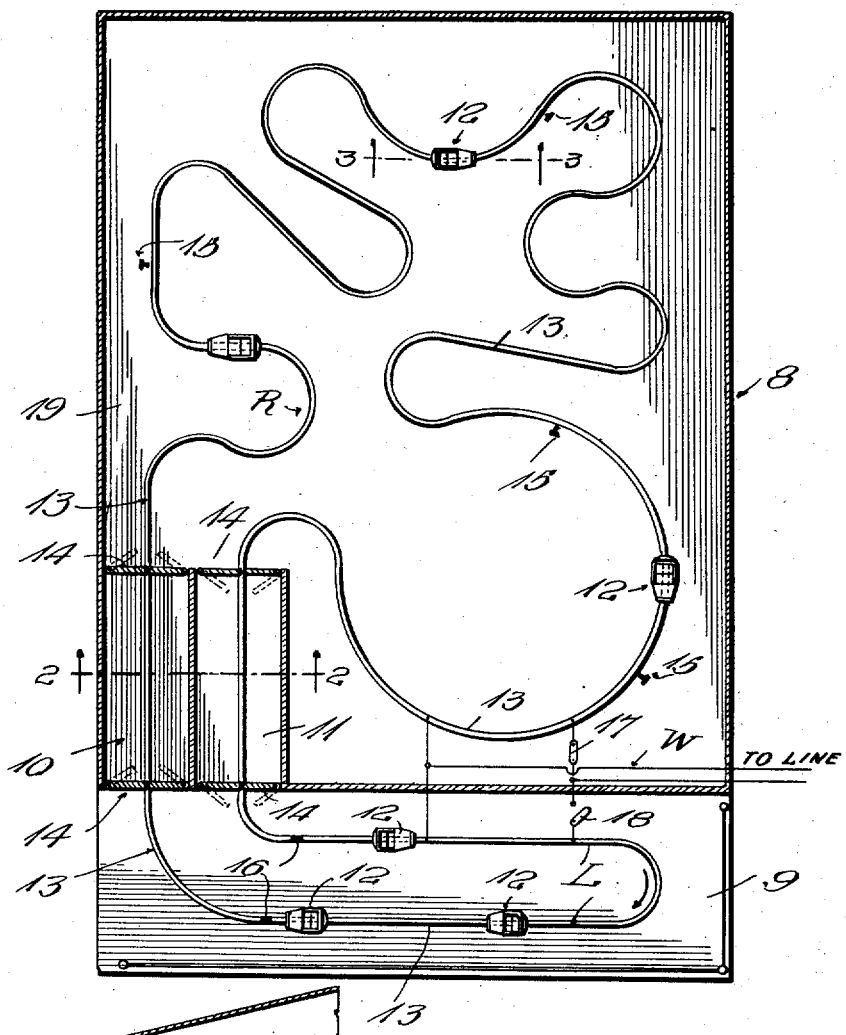
Fig. 1 is a horizontal sectional view through a building equipped with the improved amusement railway.
Figure 2:
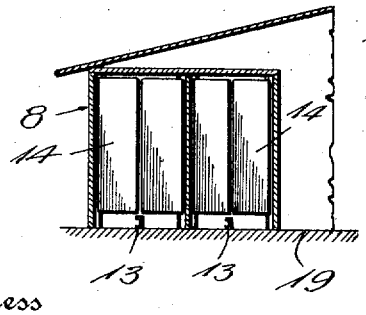
Fig. 2 is a vertical sectional view through the entrance and exit vestibules as indicated by line 2—2 of Fig. 1.

The form of construction illustrated in the drawings will be rather specifically described with the understanding that within the scope of the invention as claimed, numerous variations may be made.

The numeral 8 denotes a building which is preferably darkened. At the exterior of this building, a loading and unloading platform 9 is shown and at 10 and 11 we have illustrated entrance and exit vestibules for a plurality of cars 12 which are guided by a continuous track 13. A car-opened door 14 preferably formed of two hinged sections is disposed at each end of each vestibule 10—11 and it will be observed from Fig. 1 that both of these vestibules are of greater length than any of the cars 12. Thus, any car entering a vestibule from either the exterior or the interior of the building, first opens one door, then permits this door to close and then opens the door at the other end of the vestibule. Hence, light is excluded from the interior of the building while cars are either entering or leaving.

Within the building 8, various amusement devices and thrill producers may be mounted in conspicuous places and while such devices may be normally idle, appropriate controls 15 are provided at spaced points along the track 13 for bringing said devices into play when engaged by any of the cars 12. These control devices preferably each embody a swingable arm of some sort and this arm when swung by the car may either operate a controlling switch for one of the amusement devices, or may positively actuate such device.

Figure 3:
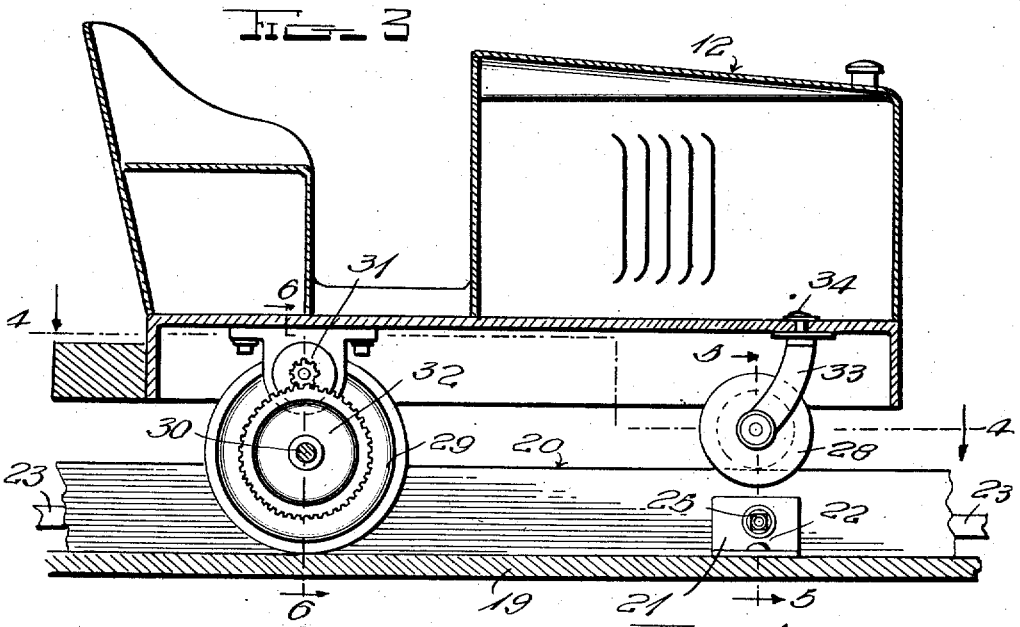
Fig. 3 is a longitudinal sectional view through one of the cars and the floor thereunder as indicated by line 3—3 of Fig. 1.
Figure 4:
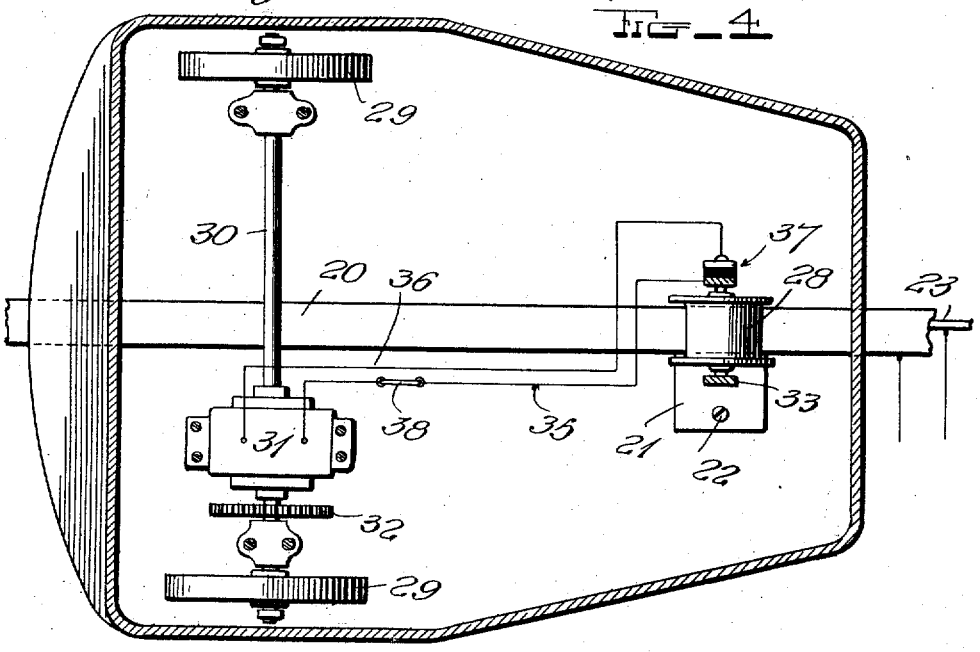
Fig. 4 is a horizontal sectional view on line 4—4 of Fig. 3.

The track 13 embodies a loading and unloading portion L upon the platform 9 and a pleasure ride portion R within the building 8. As will be hereinafter more fully described, each of these track lengths or portions embodies two current conductors for feeding current to the driving motors with which the cars 12 are provided. The conductors of the track portion L are entirely separated from the conductors of the portion R, and these two track portions are shown insulated from each other at 16 in Fig. 1. Appropriate wiring W having two switches 17—18, is shown for supplying current to the conductors of the two track portions L and R. Switch 18 is normally open so that the track portion L is dead, whereas switch 17 remains closed almost continuously so that all cars upon the track portion R will be driven. When they leave this portion however and travel upon the normally dead portion L, they either drift to a stand-still or may be stopped by a brake or in other desired way. Whenever it is desired to move cars along this track portion L, for instance after loading these cars, the switch 18 is closed, thereby supplying current to the conductors of this track portion L and consequently feeding the current to the car motors. The construction of the track and the arrangement of its current conductors are shown most clearly in Figs. 3, 5 and 6.

Extending along the floor 19 of the building 8 in any desired directions, is a car-guiding and current-feeding rail 20 which is preferably formed from channel iron or other metal with a longitudinal channel at one of its vertical sides. Brackets 21 secured to the floor by appropriate fasteners 22 are employed for anchoring the rail 20. Within the channel of this rail, is a strap metal current-feeding rail 23 which is insulated from rail 20 as indicated at 24. Bolts 25 insulated by sleeves 26, secure the parts 20—21—23 in rigidly assembled relation and insulating washers 27 preferably surround the insulated bolts between the parts 20 and 21.

The car 12 is provided with a front double-flanged wheel 28 which travels upon the rail 20, and the rear portion of this car is provided with two wheels 29 which rest upon the floor 19 at opposite sides of and spaced from the entire trackway 13. One of these wheels 29 is secured to an axle 30 and the other is free upon this axle allowing the necessary differential movement in making sharp turns. An electric motor 31 is connected by any desired means such as the gearing 32, with the shaft or axle 30, said motor being carried by the car 12. This motor receives its current from the rails 20—23. An arched fork 33 is shown carrying the wheel 28, said fork being pivoted at 34 to the front portion of the car 12, so that wheel 28 becomes a caster wheel and may remain properly engaged with the rail 20, even though the rear portion of the car may move laterally of the track. A conductor 35 leads from the fork 33 to one pole of the motor 31, and another conductor 36 leads from the other pole of this motor to a contact brush or shoe 37 which is secured to and insulated from said fork, said brush 37 contacting with the rail 23. One of these conductors may have an appropriate emergency switch 38 which may be at any convenient place upon the car 12.

The circuit of the motor 31 is completed by passage of current to the rail 23 from one side of the wiring W, travel of this current through the parts 37—36—38 to said motor and return of the current to the other side of the wiring W through the conductor 35, the fork 33, the wheel 28 and the rail 20. Thus, as long as the switch 38 is closed and current is supplied to the rails 20—23, the car will be driven.

Assuming that a number of vacant cars stand upon the track portion L as shown in Fig. 1 and these cars are then loaded for travel around the track, the operator closes the switch 18 thereby supplying current to the conductors 20—23 of said track portion L, whereupon the cars advance onto the pleasure ride track length R. As they enter the building 8 through the vestibule 10, they so manipulate the doors as to exclude light from said building and as said cars travel along the track portion R, they successively actuate the control devices 15 to effect operation of the amusement devices, thrill producers and the like controlled by said devices 15. In leaving the building, the cars pass through the vestibule 11 and so manipulate the doors thereof as to admit no light, and when the cars again pass onto the track portion L, they either come to rest or are brought to a standstill. Attention is invited to the fact that there are a number of rather abrupt turns in the portion R of the track 13. This, in conjunction with the wheeled mounting of the cars 12, causes the rear ends of these cars to lash transversely of the track, much to the amusement of their occupants. Excessive lateral movement however, is prevented by striking of the wheels 29 against the rail 20 and hence there is no danger of the car jumping from the track. The said lashing or lateral movement of the rear end of the car will obviously take place only at the curved portions or turns in the track and will vary with the speed of the car. However, the use of a single track rail with a car straddling the same and having a three point support with the front wheel support guided by the track rail will cause the front and rear wheels to travel in different arcs in rounding the curves and turns in the track. This is advantageous in that it permits very short turns to be made and consequently a relatively long length of continuous track may be installed in a small building or other small area. In prior art pleasure-ride railways known to us the cars have had four supporting wheels which run on two parallel track rails or within a definite track. Such constructions require a relatively large building or area for their installation because short turns cannot be made, and consequently they are much more expensive.

Figure 5:
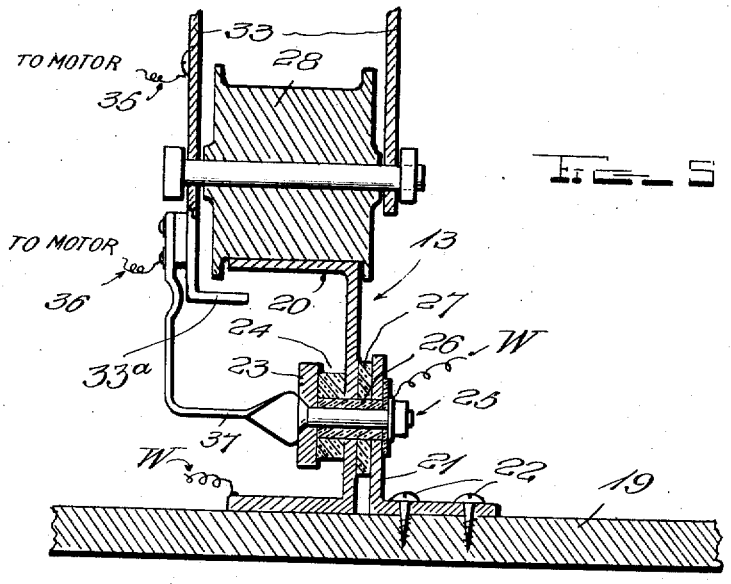
Fig. 5 is an enlarged vertical transverse sectional view on line 5—5 of Fig. 3.
Figure 6:
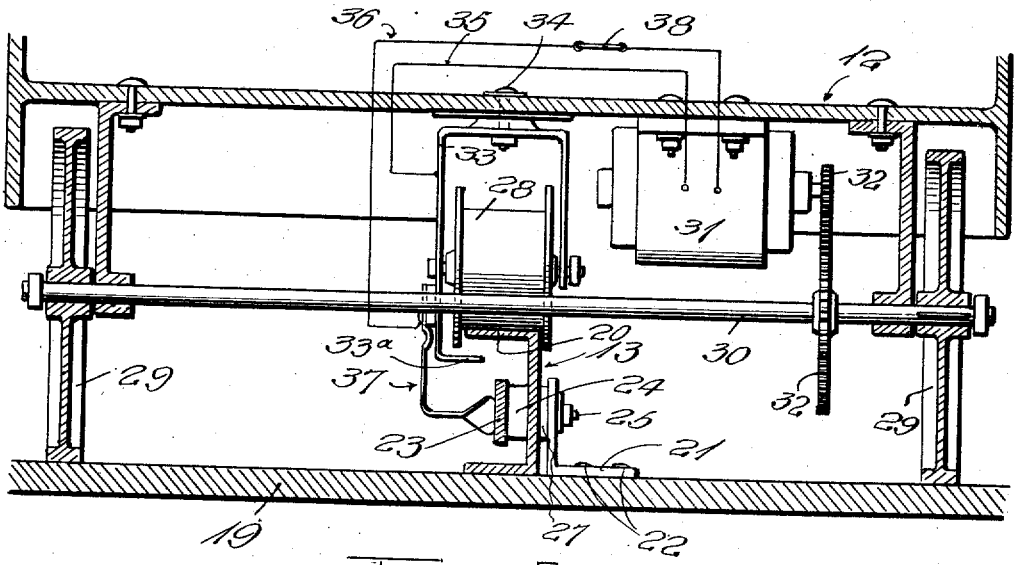
Fig. 6 is another transverse section on line 6—6 of Fig. 3.

To prevent the front or caster wheel from jumping off the track, one arm of the bracket 33 has a downwardly and inwardly extending extension 33ª which extends under the top flange of the track as shown in Fig. 5. This L-shaped extension forms a lock which prevents the car from being lifted from the track.

While excellent results are obtainable from the general construction shown and described, attention is again invited to the fact that within the scope of the invention as claimed, variations may be made.

We claim:—

1. In an amusement railway, a floor, a track extending along the same, the upper side of said track being spaced above said floor, and a car over the track and provided with a passenger seat, said car embodying rear wheels supported by said floor in laterally spaced relation with said track, and a front wheel guided by said track and swivelled on a vertical pivot, said floor being substantially free of encumbrances which would prevent lashing of the rear portion of the car transversely of the track, said rear wheels being adapted to abut said track to limit such lashing of the car.

2. In an amusement railway, a floor, a single car-guiding rail extending along the same, and a car over the rail and provided with a passenger seat, said car embodying rear wheels supported by said floor and spaced from opposite sides of said rail, and a single front support mounted on a vertical pivot and having a double-flanged wheel guided by said rail.

3. In an amusement railway, a floor, a single car-guiding rail extending along the same, and a car over the rail and provided with a passenger seat; said car embodying rear wheels supported by said floor and spaced from opposite sides of said rail, and a single front support mounted on a vertical pivot and having a double-flanged wheel guided by said rail, said floor being substantially free of encumbrances which would prevent lashing of the rear portion of the car transversely of the rail.

4. In an amusement railway, a floor, a track extending along the same and including a wheel-guiding rail, the upper side of said track being spaced above said floor, and a car over said track and provided with a passenger seat, said car embodying rear wheels which rest on said floor in laterally spaced relation with said track, a front wheeled support guided by the rail of said track, and a vertical pivot connecting said front wheeled support with the adjacent portion of the car, said floor being substantially free of encumbrances which would prevent lashing of the rear portion of the car transversely of the track, said rear wheels being adapted to abut a part of said track to limit such lashing of the car.

5. In an amusement railway, a floor, a single car-guiding rail extending along the same, and a car over the rail, said car embodying rear wheels resting on said floor and spaced from opposite sides of said rail, and a front double-flanged caster wheel guided by said rail, said floor being substantially free of encumbrances which would prevent lashing of the rear portion of the car transversely of the rail.

6. In an electrical amusement railway, a floor, a metal track extending along the same and embodying a current-conducting-and-car-guiding rail, and a current-conducting rail, and a motor-driven car over said track; said car embodying rear wheels supported by said floor, a front current-pick-up-and-guide wheel engaged with said current-conducting-and-car-guiding rail, a current-pick-up-shoe engaging said current-conducting rail, and conducting means from said front wheel and said shoe to the car motor.

7. In an electrical amusement railway, a continuous track having a loading and unloading length and a pleasure ride length, both of said lengths having current conductors and the conductors of one length being independent of those of the other length, a motor-driven car guided by said track and having current-pick-up means engageable with the current conductors of either of said track lengths; means for conducting current to the conductors of said pleasure ride length of the track, and independent switch-controlled means for conducting current at will to said conductors of said loading and unloading length of said track.

8. In an amusement railway, a darkened building having an entrance vestibule and an exit vestibule, a track having initial and final lengths passing through said vestibules respectively, cars guided by said track, and a car opened self-closing door at each end of each vestibule to exclude light from the building as any car enters or leaves, each car being of considerably less length than either vestibule, allowing one door of either vestibule to close before the other opens.

9. In an electrical railway track, a current-conducting and car-guiding rail having a longitudinal channel in one vertical side, a current-conducting rail in said channel, means insulating the two rails from each other, means securing said rails together, and means for attaching said channeled rail to a support.

10. In a pleasure-ride railway, a floor, a single car-guiding rail extending along and above the floor, a car provided with a passenger seat, said car having a central double-flanged-wheel support at its front end resting upon said rail and flange-free rear wheels laterally spaced from said rail and resting on said floor, a vertical pivot connecting said support to the car, an electric driving motor for said car, and means conductively independent of said floor for establishing an electric circuit through said motor.

11. In a pleasure-ride railway, a passenger car having a seat, said car being provided with a front central double-flanged-wheel support mounted on a vertical pivot and about which the rear end of the car may swing, and with flange-free rear wheels laterally spaced in opposite directions from the car center, a floor supporting said rear wheels, a car-guiding and conductor rail extending along and above said floor and positioned between said rear wheels in spaced relation therewith, said rail supporting said double-flanged-wheel support, a second conductor rail uni-directional with and mounted near the first named rail, current feeding means for said rails, and an electric driving motor for said car receiving its current from said rails.

12. In a pleasure-ride railway, a floor, a single car-guiding rail extending along and above the same and having curved portions, and a car over the rail and provided with a passenger seat; said car embodying rear wheels supported by said floor and spaced from opposite sides of said rail, and a double-flanged front wheel support mounted on a vertical pivot and guided by said rail; the portions of said floor along said curved portions of said rail being substantially free of encumbrances which would prevent movement of the rear portion of the car transversely of the rail.

13. In a pleasure-ride railway, a floor, a single car-guiding rail extending along and above the same and having curved portions, and a car over said rail and having a body provided with a passenger seat; said car embodying rear wheels resting on said floor and spaced from opposite sides of said rail, a wheeled support supporting the front end of the car body and guided by said rail, and a vertical pivot connecting the front end of the car body with said support, said pivot allowing free relative turning of said body and support as the front and rear wheels follow different arcs in rounding the curves of the rail.

14. An amusement railway, comprising in combination, a floor, a track extending along the floor comprising a current conducting and car guiding rail, a current conducting rail adjacent to and parallel with the track and connected in circuit with the track with a source of electricity, a motor driven passenger-carrying car straddling said track and embodying a pair of wheels tractionally supporting the rear of the car upon the floor at the outer side of the track and a front wheel traction support on the track, a vertical pivot connecting said support to the car, and current pick-up means carried by the car in electrical connection with the car motor engaging said current conducting rails of the track.

15. An amusement railway, comprising in combination, a floor, circuitous parallel conductor rails mounted over the floor and one of said rails constituting a car guiding rail, a car having a passenger seat and embodying a pair of wheels engaging the floor at the outer sides of the rails to tractionally support one end of the car and having a guide wheel support at the opposite end upon the guide rail, a vertical pivot connecting said support to the car, an electric motor carried by the car operatively connected with the floor-supported wheels, and means for conducting current from the rails to the motor including at least one conductor shoe carried by the car in electrical connection with the motor for slidable engagement with one of the rails.

16. An amusement railway, comprising in combination, a floor, a pair of parallel conductor rails mounted above the floor and one rail constituting a car-guiding rail, and a car to straddle the rails embodying a pair of wheels tractionally supporting the car at one end on the floor at the outer sides of the rails, and a support carrying a flanged wheel tractionally engaging the guide rail and the car pivotally supported at the opposite end on the support to have movement on a vertical axis intersecting the longitudinal axis of the car.

In testimony whereof, we affix our signatures.

LEON S. CASSIDY.
MARVIN REMPFER.